(12) United States Patent
Summerfield et al.

(10) Patent No.: US 7,233,962 B2
(45) Date of Patent: Jun. 19, 2007

(54) OPTICAL ERROR SIMULATION SYSTEM

(75) Inventors: Mark Adam John Summerfield, Northcote (AU); Konstantin Kuzmin, Minsk (BY)

(73) Assignee: VPIsystems Pty Ltd, Kew, Victoria (AU)

( * ) Notice: Subject to any disclaimer, the term of this patent is extended or adjusted under 35 U.S.C. 154(b) by 763 days.

(21) Appl. No.: 10/268,074

(22) Filed: Oct. 10, 2002

(65) Prior Publication Data

US 2003/0115028 A1 Jun. 19, 2003

(30) Foreign Application Priority Data

Oct. 10, 2001 (AU) .................................... PR8189

(51) Int. Cl.
*G06J 1/00* (2006.01)
*G06G 7/48* (2006.01)
*H04B 10/08* (2006.01)
*H04B 10/12* (2006.01)
*G01C 11/12* (2006.01)

(52) U.S. Cl. ........................... 708/2; 398/27; 398/202; 356/2; 703/6

(58) Field of Classification Search .................. 398/27, 398/202; 703/2, 6; 708/2
See application file for complete search history.

(56) References Cited

U.S. PATENT DOCUMENTS 6,904,237 B2 * 6/2005 Rasztovits-Wiech et al. . 398/27
6,912,359 B2 * 6/2005 Blumenthal et al. .......... 398/29

2002/0149812 A1 * 10/2002 Hong et al. .................. 359/110

OTHER PUBLICATIONS

S.K. Shin et al., "New quasi-analytic BER estimation technique on the nonlinear satellite communication channels", 1999, IEE, pp. 68-72.*
Ronald E. Walpole and Raymond H. Myers, "Probability and Statistics for Engineers and Scientists", 1993, Macmillan Publishing Company, Fifth Edition, pp. 169-171.*
Jan Conradi, "A Simplified Non-Gaussian Approach to Digital Optical Receiver Design with Avalanche Photodiodes: Experimental", 1991, IEEE, pp. 1027-1030.*
Dunning et al., "Multichannel Infrared Receiver Performance", Applied Optics 1979 p. 1567-1576.*
Chan et al., "On the Non-Gaussian Noise in Erbium-Doped Fiber Amplifiers" IEEE 1997. p. 680-687.*
Summerfield-M. "Comments on Optical Amplifier Noise Figure Reduction for Optical Single-Sideband Signals" IEEE 2000. p. 1271-1273.*
Pendock et al., "Transmission Peformance of High Bit Rate Spetrum-Sliced WDM Systems" 1996 IEEE p. 2141-2148.*

(Continued)

*Primary Examiner*—Anthony Knight
*Assistant Examiner*—Tom Stevens
(74) *Attorney, Agent, or Firm*—Banner & Witcoff, Ltd.

(57) ABSTRACT

There is disclosed a method and computer program product for estimating a measure of the quality of the received signal in a computer simulation of an optical transmission system, wherein the simulation includes additive optical noise generated by components within the transmission system. The method and product are able to account for non-Gaussian statistics of noise fluctuations observed in the receivers of optical communications systems, in order to provide for the more accurate simulation of system performance than may be the case using prior art methods based on Gaussian approximation.

20 Claims, 7 Drawing Sheets

OTHER PUBLICATIONS

Giles et al., "Modeling Erbium-Doped Fiber Amlifiers" 1991 IEEE p. 271-283.*

J. Townsend et al., "On Improving the Computational Efficiency of Digital Lightwave Link Simulation," *IEEE Trans. on Comm.*, vol. 38, No. 11, Nov. 1990, pp. 2040-2048.

S. Geckeler, "Fast Numerical Approximation of the Bit Error Rate Cause by Non-Gaussian Noise," *Frequenz*, vol. 44, No. 2, Feb. 1990, pp. 74-79 (English Abstract).

R. Lima et al., "On the Simulation of Digital Optical Links with EDFA's: An Accurate Method for Estimating BER Through Gaussian Approximation," *IEEE J. of Selected Topics in Quantum Electronics*, vol. 3, No. 4, Aug. 1997, pp. 1037-1044.

N. Mandayam, et al., "Gradient Estimation for Stochastic Optimization of Optical Code-Division Multiple-Access Systems: Part I—Generalized Sensitivity Analysis," *IEEE J. on Selected Areas in Comm.*, vol. 15, No. 4, May 1997, pp. 731-741.

P. Megret et al., "Bit-error-rate Computation in Optical Fibre Links by Gram-Charlier Series Expansion," *Proc. IEEE Third Symp. on Comm. and Vehiculuar Tech. in the Benelux*, 1995, pp. 180-186.

F. Abramovich et al., "Some Statistical Remarks on the Derivation of BER in Amplified Optical Communication Systems," *IEEE Trans. on Comm.*, vol. 45, No. 9, Sep. 1997, pp. 1032-1034.

D. Marcuse, "Derivation of Analytical Expressions for the Bit-Error Probability in Lightwave Systems with Optical Amplifiers," *J. Lightwave Tech.*, vol. 8, No. 12, Dec. 1990, pp. 1816-1823.

D. Marcuse, "Calculation of Bit-Error Probability for a Lightwave System with Optical Amplifiers and Post-Detection Gaussian Noise," *J. Lightwave Tech.*, vol. 9, No. 4, Apr. 1991, pp. 505-513.

* cited by examiner

OPTICAL ERROR SIMULATION SYSTEM

CROSS REFERENCE TO RELATED APPLICATIONS

This application claims priority under 35 U.S.C. § 119 to prior Australian Patent Application No. PR8189, filed Oct. 10, 2001, the entire contents of which are incorporated herein by reference.

FIELD OF THE INVENTION

The present invention relates to the estimation of signal quality in simulation of optical communications systems.

BACKGROUND OF THE INVENTION

Recently, there has been an explosion in the use of optical fibre telecommunications as the main backbone for the carriage of data in telecommunications networks.

The installation or maintenance of large complex optical networks is often a major and expensive undertaking. Obviously, in planning, certain capacity requirements may have to be met. Optical systems operate in the real world and are subject to error rates due to inherent noise in the equipment utilized in the system and in nature generally.

In the planning of large scale optical systems, it is desirable to be able to simulate the performance of a system before installation or change so as to determine whether operational requirements will be met. Ideally, such simulation systems also provide for the simulation of bit error rates when applied to the system.

Unfortunately, the methods previously utilized in the simulation of bit error rates often lead to inaccurate simulation results. This is often a result of utilizing perhaps inappropriate Gaussian noise statistics when simulating bit error rates of an optical system.

SUMMARY OF THE INVENTION

It is an object of the present invention to provide for an improved method and system for the simulation of optical errors.

The invention resides in the recognition that the random noise processes that affect an optical signal during transmission may be modeled independently of the noise processes that affect the signal after conversion to the electrical domain in the receiver. The statistical properties of the received optical signal may be analyzed initially without including further random fluctuation caused by post-detection noise. Then, given a set of parameters characterizing the post-detection noise processes, a measure of quality such as the bit error rate may be calculated including the effect of the pre-detection and post-detection noise processes in combination.

One aspect of the present invention provides a method for estimating a measure of the quality of a received signal in a computer simulation of an optical transmission system, wherein the simulation includes additive optical noise generated by components within the transmission system. The method includes the steps of: (a) calculating one or more sets of parameters of a first non-gaussian probability density function so as to approximate a suitable fit to the amplitude distribution of the received signal, including the effects of "deterministic processing" in the receiver but excluding the effects of statistical noise fluctuations introduced by the receiver; (b) calculating one or more sets of parameters of a second non-gaussian probability density function that approximates a suitable fit to the amplitude distribution of the received signal, including the effects of "deterministic processing" and "statistical noise fluctuations" in the received signal using the calculated set(s) of parameters of the first non-gaussian probability density function and pre-specified statistical properties of the noise fluctuations introduced by the receiver; and (c) computing the measure of quality using the set(s) of parameters of the second non-gaussian probability density function.

The phrase "deterministic processing" refers to the operations performed within the receiver that are fully determined by the characteristics of the receiver components and which produce results without random variation, such as the process of low-pass filtering of the signal which may be performed prior to sampling of the received signal.

The phrase "statistical noise fluctuations" refers to the processes which occur in the receiver which are random in nature and which produce results that are subject to statistical variation, such as the electrical noise processes which naturally occur in components such as resistors and other electronic devices.

The method of the invention provides a number of advantages over prior art techniques, such as the ability to obtain more accurate estimation of the measure of signal quality (e.g. bit-error rate) over a simulation run of a given duration or, alternatively, an equally accurate estimate over simulation run of substantially reduced duration.

In one embodiment the components of the transmission system include optical amplifiers. The optical amplifiers may comprise erbium-doped fiber amplifiers. The statistical properties of the noise introduced by the receiver may comprise a Gaussian distribution characterized by its mean and variance.

Preferably, the first non-gaussian probability density function comprises a non-central $\chi^2$ probability density function. The $\chi^2$ probability density function is known to be the exact form of the distribution of the detected signal amplitude in the case of ideal reception of an optical signal corrupted by additive noise such as that introduced within optical amplifiers. It has been discovered by the present inventors that this distribution is a good fit in the case of many practical systems designed to approximate as closely as possible the ideal system.

Another aspect of the present invention provides a computer program embodied on a computer readable medium for estimating a measure of the quality of a received signal according to the above described method.

A further aspect of the present invention provides an apparatus for implementing the above described method.

In a preferred embodiment the received signal comprises an intensity modulated digital signal and the measure of the quality of the received signal may comprise the bit error rate. At least two sets of parameters for each of the first and second non-gaussian probability density functions may be calculated, corresponding respectively to the amplitude distributions of received data "ones" and received data "zeros".

Preferably, the received signal is passed through a narrow optical filter prior to reception.

BRIEF DESCRIPTION OF THE DRAWINGS

Preferred and other embodiments of the present invention will now be described by way of illustration only with reference to the accompanying drawings in which.

DETAILED DESCRIPTION OF THE EMBODIMENT

In the preferred embodiment, there is provided a method for estimating the Bit Error Rate (BER) of a received signal in a computer simulation of an optical transmission system, including the effects of post-detection degradation such as electrical noise and photodetector dark current.

The preferred method includes the steps of calculating the parameters of non-central $\chi^2$ probability density functions that are best-fits to the distributions of the amplitude of the received signal in the absence of post-detection degradation effects and computing the BER of the received signal, including the effects of post-detection degradation effects, using the calculated parameters of the non-central $\chi^2$ probability density functions, and the parameters of the post-detection degradation effects.

Figure 1:
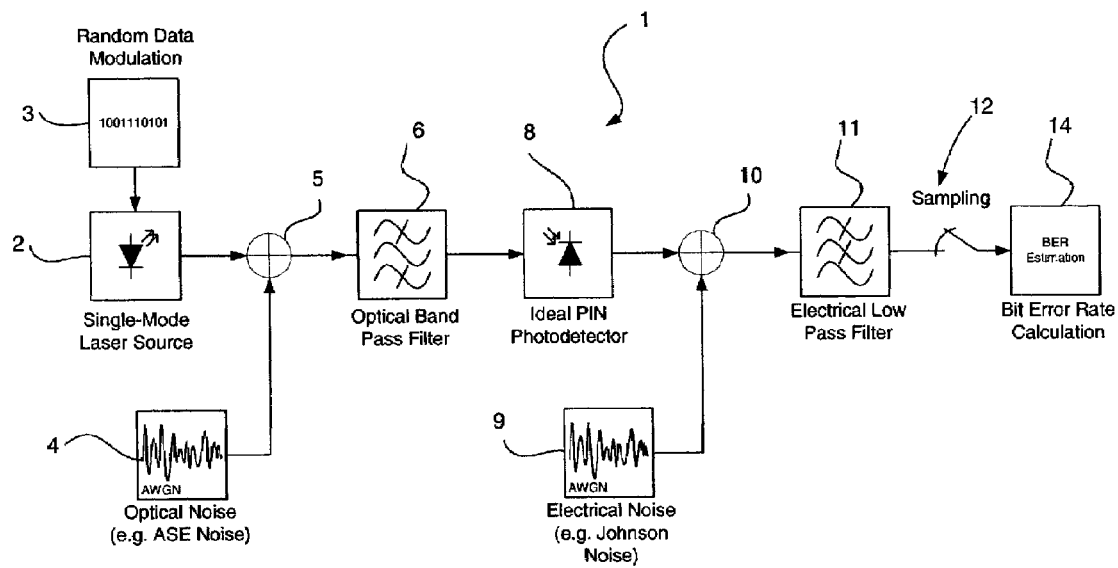
FIG. 1 illustrates schematically an example simulation system to which the method of the preferred embodiment can be applied.

By way of explanation of aspects of the method of the preferred embodiment, the operation of the method is described in an example simulation environment. An example system for use with the method is illustrated in FIG. 1. Such a system may be simulated in software operating on standard computer hardware. In the example 1, the optical data source 2 is considered to be a single frequency laser modulated by a pseudo-random bit sequence 3 (PRBS) with a nominal 50% mark ratio (i.e., equal numbers of ones and zeros generated on average). Optical white noise 4 is added 5 to the signal, which has a zero-mean Gaussian field amplitude distribution. This may represent additive amplified spontaneous emission (ASE) noise generated in optical amplifiers, for example. The signal and noise are filtered using an optical bandpass filter 6 centered on the output frequency of the laser. The combined optical signal and noise are received by direct-detection with an ideal PIN photodetector 8, and then additional noise 9 is introduced 10 representing the electrical noise added in the components of the receiver circuitry. Low pass filtering is applied 11 to the resulting signal, and the output of the filter is sampled 12 at a frequency equal to the bit rate. The sample values represent the signal amplitude (voltage or current) at the sampling instants, and the distribution of these values can be used to estimate the overall probability density functions (PDFs) for transmitted data ones and zeros. These PDF estimates are then used to calculate estimates of the BER at the receiver 14.

Now different methods can by used to simulate the presence of noise 9 in the receiver and hence for determining the BER of the system 1. Example methods can include:

1. A prior art method comprising an ideal system model using an integrate-and-dump receiver.

2. A prior art method comprising a pure stochastic sampled model using Gaussian approximation.

3. A method according to a preferred embodiment of the present invention comprising a stochastic sampled model assuming chi-squared statistics for the received optical noise, combined with semi-analytical calculation of the impact of post-detection noise (a hybrid chi-squared method).

4. A prior art method comprising a stochastic sampled model assuming Gaussian statistics for the received optical noise, combined with semi-analytical calculation of the impact of post-detection noise (a hybrid Gaussian method).

Taking each model separately:

1. Ideal System with Integrate and Dump Receiver (Gauss I&D)

A calculation method has previously been described for an ideal system with an integrate and dump (I&D) receiver in D. Marcuse, "Calculation of Bit-Error Probability for a Lightwave System with Optical Amplifiers and Post-Detection Gaussian Noise," *J Lightwave Technol.*, 9 (4), April 1991, pp. 505–513), the entire content of which is incorporated herein by cross reference. In this case, a number of assumptions are made, including the assumption that all energy in each bit is confined to its corresponding bit interval. The optical band pass filter is a perfect rectangular filter with a bandwidth of $B_{opt}$. The electrical low pass filter consists of an ideal integrator which integrates over the full bit period. The sampling instant occurs at the end of the integration time, and the integrator then instantaneously resets (i.e., it is memoryless).

In this particular case, analytical results for the PDFs and the BER can be obtained under a Gaussian approximation. In the case where the post-detection Gaussian noise is negligible, the statistics of the detected optical field follow a chi-squared distribution. When both the optical noise and post-detection Gaussian noise must be considered, the resulting distribution can in principle be obtained from the convolution of the appropriate chi-squared and Gaussian PDFs, however there is no known closed-form expression for the resulting distribution function. Efficient numerical methods have been developed by Marcuse to calculate the PDFs and corresponding error probabilities, which are highly accurate for low error rates (less than $10^{-3}$) that are of the greatest interest. This numerical calculation method shall be referred to as the Marcuse method.

Under the assumptions above, the system is highly idealized, and the results obtained are often optimistic compared to a realistic implementation. The I&D receiver is similar in performance to an ideal filter and sample receiver with a perfect matched filter with noise equivalent electrical bandwidth $B_e=1/(2T)$ (where T is the bit period). Such systems are not realized in practice at the very high bit-rates typically employed in baseband optical transmission systems. Thus the results from this ideal system model are likely to indicate artificially superior performance as compared to those obtained from a model constructed from realistic individual component models.

Furthermore, the idealized I&D system model makes assumptions about the entire system, not just the receiver components and BER estimation. Therefore it cannot be applied to the simulation of more general systems comprising further components in addition to the idealized transmitter, receiver and noise sources represented in FIG. 1.

2. Stochastic Sampled Model: Gaussian Approximation

In the absence of any more specific knowledge of the expected form of the PDF, the most common approach employed is simply to assume that the statistics are Gaussian. A sampled numerical simulation of the system can be carried out, with the noise sources modeled by using Gaussian-distributed pseudo-random number generators to generate noise samples that are added to the signal samples. At the output of the electrical filter, the mean and variance of the resulting samples can be calculated at each sampling instant across the bit-frame, which are sufficient to fully determine the statistics under the Gaussian approximation. So long as a sufficiently large number of bit periods are simulated (typically greater than $10^3$ bits), the estimates of mean and variance can have small confidence intervals, and the method is fairly effective.

The use of a sampled simulation technique enables realistic models of the system components to be used. It also enables general system models to be constructed, using simulation models of all the components that exist in the real system. In the example, the following component models were used. The signal source 2 comprises a single frequency CW laser emitting at an optical frequency of 193.1 THz, modulated via an external Mach-Zehnder modulator with an extinction ratio of 30 dB. The driving signal to the modulator consists of an NRZ waveform derived from the generated PRBS 3, with Gaussian edges having rise and fall times equal to one quarter of the bit period. The optical noise source 4 was implemented as a zero-mean Gaussian pseudo-random generator producing white noise samples resulting in a constant noise power spectral density over the full sampled optical bandwidth. The variance of this generator is expressed as the desired optical noise power spectral density (in units of W/Hz).

The optical bandpass filter 6 was assumed to be a trapezoidal filter that closely approximates the ideal rectangular filter assumed in the ideal system model. It had a flat-top bandwidth of $B_{opt}$, and the transmission fell away rapidly on either side of this bandwidth, reducing to −10 dB within 1 GHz of the pass band edges.

An ideal PIN photodetector 8 was assumed, with a quantum efficiency of unity, corresponding to a responsivity of 1.252 A/W @ 193.1 THz. Dark current was not considered in the example, and shot noise was negligible compared to the optical and electrical additive noise, and was excluded from the model.

The electrical noise source 9 was implemented as a zero-mean Gaussian pseudo-random generator producing white noise samples resulting in a constant noise power spectral density over the full sampled electrical bandwidth. The variance of the generator is expressed as the desired electrical noise current density (in units of $A/Hz^{1/2}$). The electrical filter 11 used in the example was a third-order Bessel filter, with bandwidth equal to 70% of the bit rate. The sampling time is taken to be at the center of the bit frame.

3. Stochastic Sampled Model: Hybrid Chi-Squared Method (BER Stochastic Chi 2)

The principal disadvantage of the above Gaussian-approximated stochastic model is that the statistics of the detected optical signal are non-Gaussian. In particular, a square-law detector cannot produce negative output values, and the resulting distributions will therefore exhibit skewness, which is not a feature of the normal distribution. One possible approach would be to estimate a third moment of the sample distributions at the input to the BER estimator, in addition to mean and variance. However this is likely to be very inefficient, since a much larger number of bits must be simulated in order to obtain an acceptably accurate estimate of a higher-order moment. In the method of the preferred embodiment, a specific form for the PDF is assumed, and a fitting method is tailored to the assumed distribution. In general, the action of linear filtering in both the optical and electrical domains alters the PDF observed at the BER estimator. Linear operations performed on Gaussian-distributed random variables result in outputs that are also Gaussian distributed. However, this is not true in general, and so the exact form of the distributions appearing at the BER estimator is not known for an arbitrary system. In the method of the preferred embodiment, a hybrid $\chi^2$/Gaussian distribution is utilized in the example arrangement.

Four parameters are required to fully specify the hybrid $\chi^2$/Gaussian distribution. The $\chi^2$ distribution (non-central, in general) introduces three parameters in its classical form: a scaling factor, the non-centrality parameter and the number of degrees of freedom. A number of alternative parameterizations of the distribution are possible, such as those used in the preferred embodiment of the present invention, however in all such cases there will remain three independent parameters.

Description of the post-detection Gaussian noise requires an additional fourth parameter, namely the electrical noise variance. Estimation of these four parameters based purely upon the samples input to the BER estimator is infeasible for reasonable sample sizes using a general technique such as the method of moments. Thus an improved technique for use with the preferred embodiment has been developed.

The first step in the method is to remove the requirement to estimate the electrical noise variance. Instead of constructing the receiver literally as shown in FIG. 1, the electrical noise source 9 is removed so that the samples arriving at the BER estimator 14 comprise only the filtered signal with received optical noise. Estimates of the mean and variance of these input samples are computed, and these estimates used to construct an expression for the non-central $\chi^2$ distribution that depends only upon the number of degrees of freedom. Then a histogram of the received samples is constructed, and the number of degrees of freedom estimated by finding the value that produces a best-fit $\chi^2$ distribution to the histogram data. The final PDFs and BER are calculated using Marcuse's method to include the effect of the total electrical noise variance that can be obtained by multiplying the electrical noise power spectral density by the electrical filter bandwidth. Thus the BER estimator now requires these two quantities to be provided as additional parameters. This implies some loss of generality in the application of the algorithm to the example, since the electrical noise is not passed through the actual processing elements of the receiver. However, the general receiver structure shown in FIG. 1 is the most common structure employed in baseband digital optical transmission systems, and so the impact of this loss of generality is minimal.

4. Stochastic Sampled Model: Hybrid Gaussian Method (BER Stochastic Gauss)

There may be cases in which the $\chi^2$ distribution does not produce a good fit to the histogram constructed from the samples received by the BER estimator. For example, it may be that the assumption of optical noise dominated by additive ASE is invalid due to other sources of noise being present in the system. Or the specific nature of the optical and/or electrical filtering employed may result in a distribution that is not well approximated by a chi-squared distribution with any number of degrees of freedom. In this case, it is desirable for the BER estimator to be able to fall back to a Gaussian approximation, either automatically or under user control. This results in a hybrid Gaussian method, in which the mean and variance of the received optical signal without additive electrical noise are first estimated, and then the additional variance of the post-detection Gaussian noise is added to the estimated variance.

Testing Method Examples

Comparative tests were performed by calculating complete BER curves, rather than individual BER values. A BER curve can be obtained by varying the total optical power at the input to the receiver 8, and measuring the BER as a function of this received optical power. Experimentally, such curves can be obtained by placing a variable attenuator in front of the receiver. In the simulation tests, the same effect is achieved more directly by placing a power controller in front of the receiver. The power controller comprises a numerical module that scales the input samples to the desired average power representation. As the received power is varied, the optical noise 4 varies in proportion, however the post-detection electrical noise 9 is constant. Thus at relatively low levels of received optical power, the receiver noise dominates, and the PDFs at the BER estimator input have strongly Gaussian characteristics. At high levels of received optical power, the optical noise may dominate, and the PDFs at the BER estimator input have strongly non-Gaussian characteristics. When optical noise is present there will be a high-power limit to the minimum BER achievable, corresponding to the effect of the optical noise alone. This is usually known as the BER floor.

When there is no optical noise present in the received signal, the BER measurement will characterize the performance of the receiver (and, to a lesser extent, the transmitter). The BER will be the result of the additive electrical noise 9 only, and as the received optical power is increased, the signal-to-noise ratio will increase, and thus the BER will decrease indefinitely. For purely Gaussian noise, the resulting curve is straight line on the commonly used error function scale. This line represents the limits of the receiver performance, and can be referred to as a back-to-back BER curve.

Figure 2:
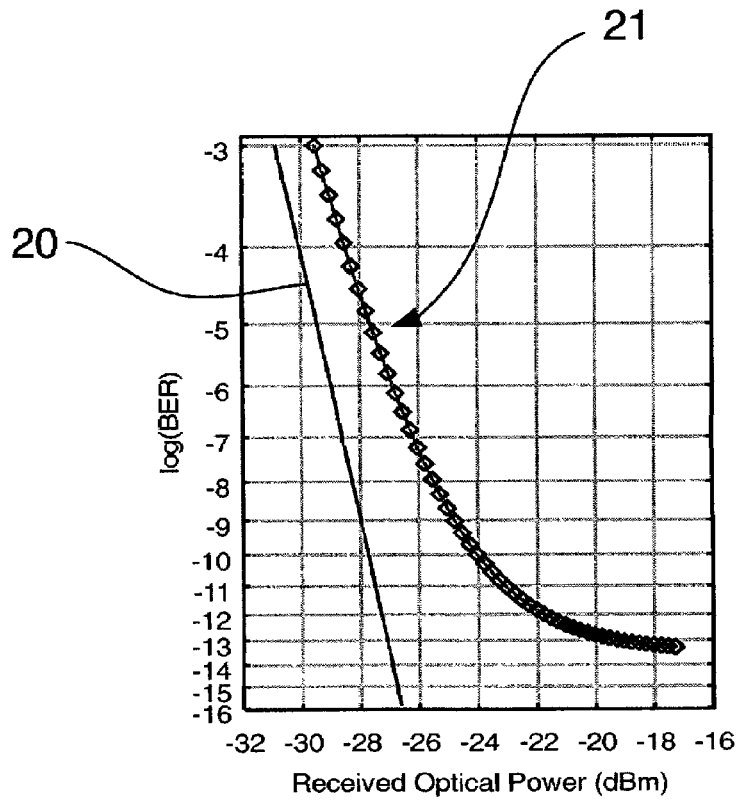
FIG. 2 is a graph showing the variance of Bit Error Rates with received optical power.

To fully characterize a given optical system, it is usual to measure both the back-to-back curve (i.e., the receiver limit) by connecting the transmitter directly to the receiver, followed by a system curve in which the optical system is included. FIG. 2 illustrates the back to back measurement 20 and a typical system measurement 21. The difference between the two curves 20, 21 represents the system impairment.

For the example system of FIG. 1, back-to-back BER curves can be obtained by simply turning off the optical noise source (i.e., by setting its power spectral density to zero). In order to allow for a fair comparison between the four different methods, the electrical noise power was set differently for the ideal I&D model, and the three sampled simulation models, such that in all cases the receiver sensitivity was −20 dBm for a BER of $10^{-9}$. In order to achieve this, the electrical noise power is lower for the sampled simulation model than for the ideal I&D model, in order to compensate for the higher effective bandwidth of the low-pass filter compared to the ideal integrating filter. Note that the ratio $\sigma_{th(ID)}^2/\sigma_{th(s)}^2 = 1.42$, i.e., almost exactly the ratio of the simulation filter bandwidth to the effective bandwidth of the integrate and dump filter (0.7/0.5). The system and receiver parameters for the examples are shown in Table 1.

TABLE 1

General system and receiver parameters for tests.

| Parameter Symbol, Units and Description | Value for I & D Model | Value for Simulation Models |
|---|---|---|
| BR (Gb/s) Bit rate | 10 | |
| $B_{opt}$ (GHz) Optical filter bandwidth | 80 | |
| $\sigma_{th}$ (A/Hz$^{1/2}$) Electrical noise current | $2.947 \times 10^{-11}$ | $2.466 \times 10^{-11}$ |
| $B_e$ (GHz) Electrical filter bandwidth | 5.0 (i.e., BR/2 effective noise equivalent bandwidth) | 7.0 |
| $N_b$ Number of transmitted bits | — | 8192 |

Figure 3:
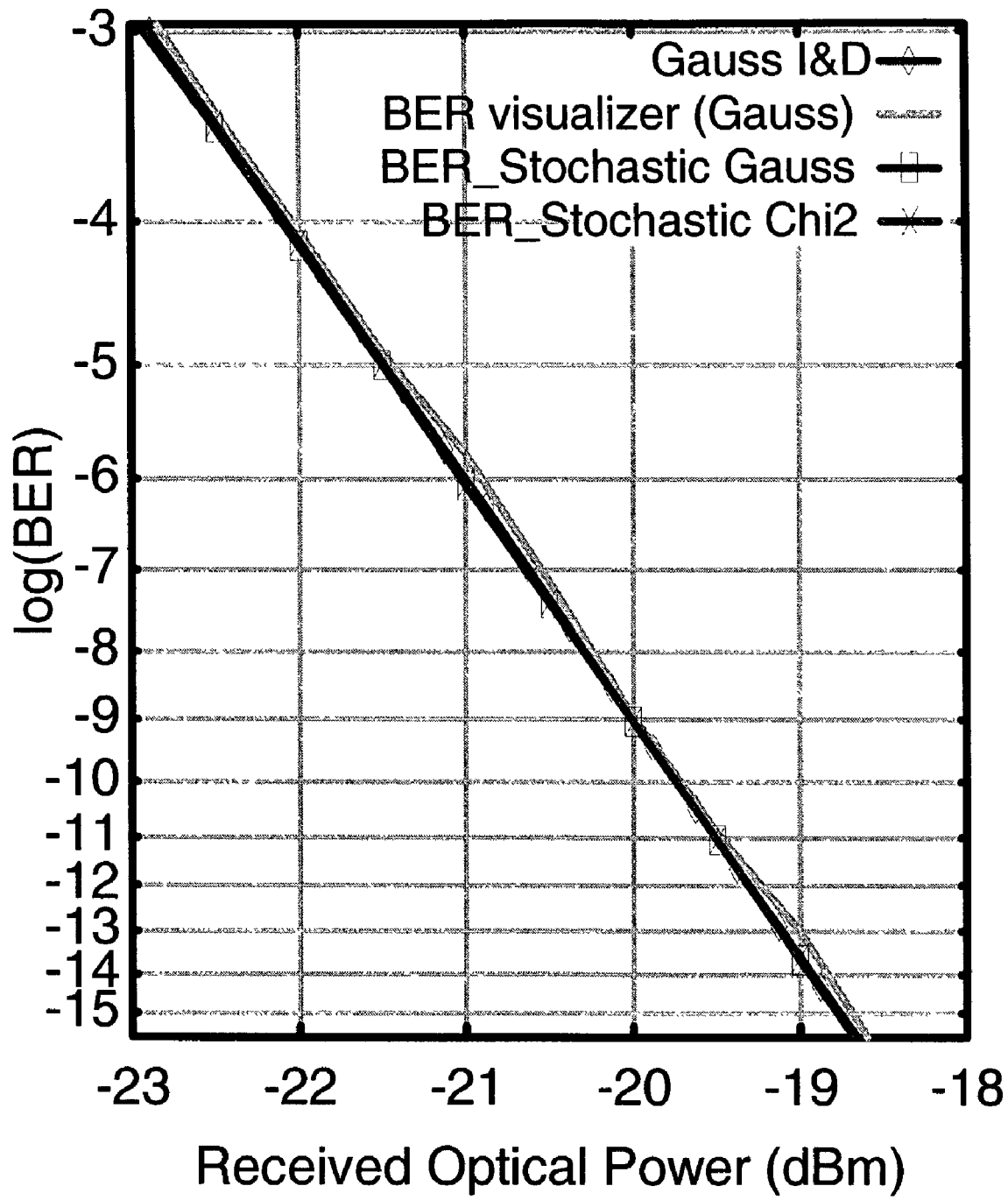
FIG. 3 is a graph showing a comparison of back to back BER curves for different estimation methods.

The results of the back-to-back tests are shown in FIG. 3. The following features are of interest. The Gaussian approximation method, which uses a purely statistical estimate of the mean and variance on each run, produces essentially the same results as all other methods. Some variability is apparent, due to the fact that on each run a different set of electrical noise samples is generated, resulting in some statistical fluctuations. However, for the number of bits simulated (8192) these fluctuations are small.

The hybrid gaussian and chi-squared methods also produce the same results as the BER visualizer and the I&D model. This confirms the validity of applying the electrical noise density and bandwidth as parameters to the BER estimator. In the BER visualizer, the electrical noise has been generated and then passed through the filter, whereas in the case of the two hybrid methods the noise variance is computed directly from the known noise spectral density and filter bandwidth. The results are, for all practical purposes, identical. The hybrid methods exhibit no statistical fluctuations, because the effect of the electrical noise is computed deterministically.

For the system measurements, additive optical noise was considered that was fully polarized parallel to the signal polarization state. For all methods, the total additive optical noise power spectral density was set so that the optical signal-to-noise ratio, measured in the optical frequency domain using a 0.1 nm (12.479 GHz @ 1550 nm) resolution bandwidth, was 18 dB. (Note that since the total received optical power is set at the input to the receiver, the absolute value of additive optical noise is not relevant, however for the simulation methods, the absolute values of signal power and noise power spectral density were 1.01 mW and 2.56× $10^{-15}$ W/Hz respectively at the input of the power combiner).

Figure 4:
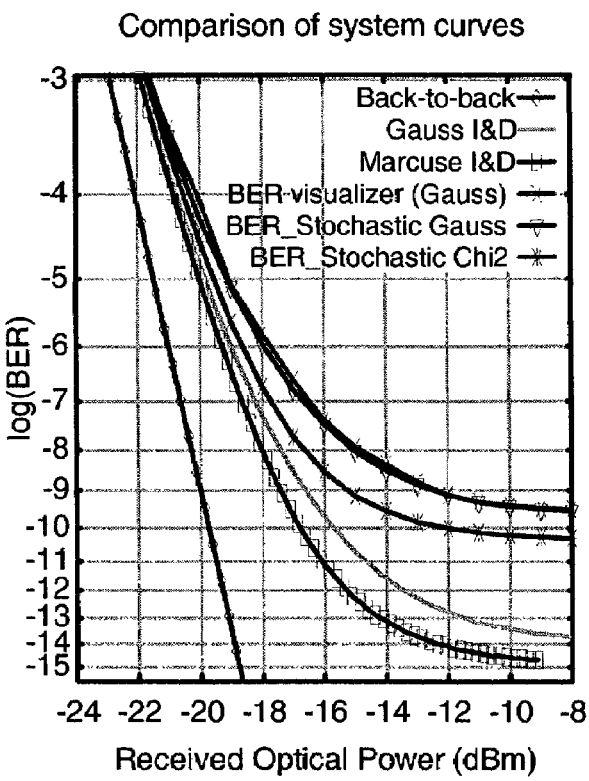
FIG. 4 is a graph showing system BER curves for different estimation methods for an optical filter bandwidth of 80 GHz.

The results of the system BER curves for the different methods for an optical filter bandwidth of 80 GHz are shown in FIG. 4. A number of observations can be made.

The I&D models predict significantly better performance than the simulation models. As previously noted, this may be expected since they represent an ideal system that will never be achieved in practice. In fact, the difference could be explained by the difference in effective electrical bandwidth of the two receiver models, as follows. For the Gaussian approximation, the relationship between the Q-factor and the BER is given by $$BER = \frac{1}{2} erfc\left(\frac{Q}{\sqrt{2}}\right) \approx \frac{1}{\sqrt{2\pi} \, Q} e^{-\frac{Q^2}{2}} \quad (1)$$

Furthermore, if the signal-to-noise ratio is reasonably high, the relationship between the Q-factors $Q_1$ and $Q_2$ of two systems having electrical noise bandwidths of $B_{n1}$ and $B_{n2}$ respectively, is given by $$\frac{Q_2}{Q_1} \approx \sqrt{\frac{B_{n1}}{B_{n2}}} \quad (2)$$

Considering the Gaussian approximation results shown in FIG. 4, a BER of $10^{-9}$ is obtained in the simulated system at a received optical power of about −12.2 dBm. The corresponding Q-factor is 6.0. Thus, the predicted Q-factor and BER for the I&D system using Equations (1) and (2) are $Q=6.0\times\sqrt{0.7/0.5}=7.1$, and BER=$6.4\times10^{-13}$. This BER value corresponds very closely to the value calculated using the Gaussian approximation for the I&D system.

For low received optical power, where post-detection Gaussian noise dominates, all methods produce similar results. This is to be expected, given that the back-to-back measurements in which the noise was purely Gaussian, were identical. The offset between the back-to-back curve and the system curves at low received power is due to the effective extinction ratio degradation caused by the average optical noise current (the received optical power is a total, and therefore includes the optical noise power). This is a commonly observed phenomenon in experimental BER measurements.

Figure 5:
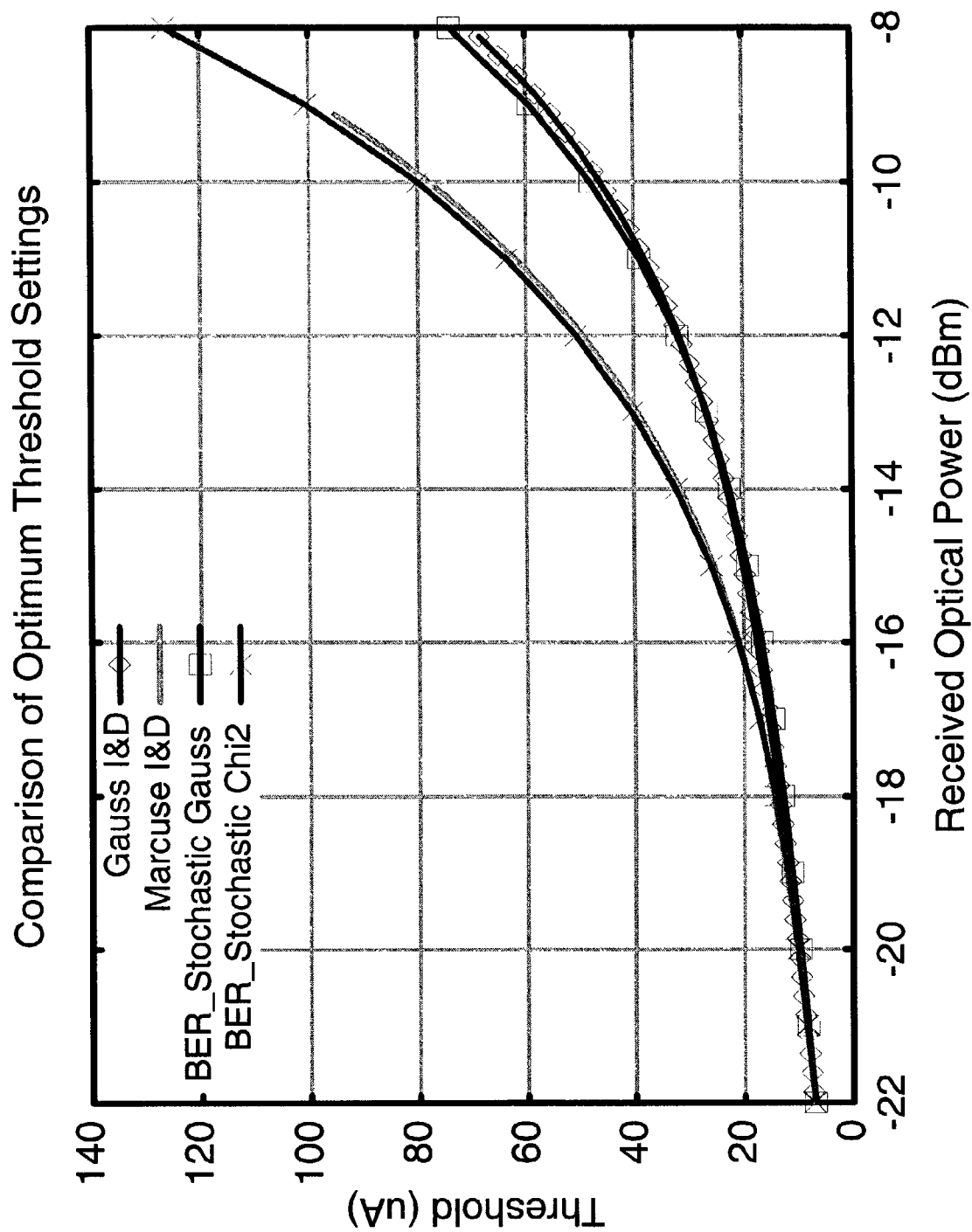
FIG. 5 is a graph showing the optimum threshold setting as a function of received optical power for four different estimation methods.

The difference between the Gaussian approximation and the improved distribution estimate is similar for both the I&D method, and the sampled simulation methods. In all cases, the Gaussian approximation overestimates the BER. There are also significant differences in the corresponding optimum threshold settings. FIG. 5 shows the optimized threshold settings determined using the I&D model with Gaussian approximation, the I&D model using the Marcuse method, and the hybrid Gaussian and chi-squared simulation models. Although the error probabilities calculated for the idealized I&D system, and the simulated system, are quite different, the corresponding optimum threshold settings are very similar, for both the Gaussian approximation, and the chi-squared case. This reflects the fact that although the low pass filter in the simulated system allows more noise to pass, resulting in a degraded SNR at the BER estimator, the statistical form of the noise in both models is very similar. As in the back-to-back results, the BER visualizer produces very similar results to the hybrid method using the Gaussian approximation at all optical power levels. This further confirms that for the standard baseband direct detection receiver consisting of a PIN detector and a low pass filter, there is no appreciable difference between the results obtained by passing random noise samples through the low pass filter model, and those obtained by computing the effect of post-detection noise directly from the noise spectral density and the filter bandwidth.

The observation above regarding the differing optimum threshold for the Gaussian approximation and the more accurate methods is significant. Comparison of the final, optimized BER estimates alone suggests that the difference between using a Gaussian approximation and a more detailed model of the noise statistics, is relatively small. However, the corresponding optimum threshold settings are quite different, for both the ideal I&D system model, and the simulated system model. The implication is that the Gaussian approximation can result in the calculation of an incorrect optimum threshold setting, however because the (incorrect) Gaussian assumption is then also used to calculate the BER, the consequences of the error are reduced.

All the previous results used an optimized decision threshold setting when calculating the final BER estimates. In a practical system, true optimization of the threshold is rarely performed. Instead, receiver filters with a finite low frequency cutoff are generally used, with automatic gain control or equivalent circuitry to allow a threshold to be set relative to the received signal voltage or current amplitude. Thus, for many practical cases, a fixed relative threshold setting is a more realistic model of this receiver circuitry.

FIG. 5 suggests that quite different BER estimates will be produced for the Gaussian and hybrid chi-squared estimation methods. In particular, if it is desired to simulate a system using a relative threshold setting, then an accurate model of the noise statistics is desirable if the results are to be comparable to those that would be obtained by experimental measurement of a real system.

Figure 6:
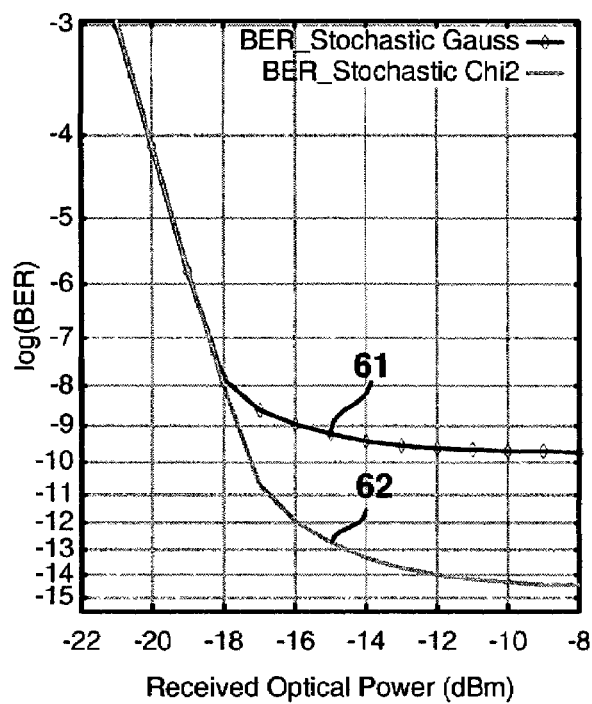
FIG. 6 is a graph showing the comparison of system BER curves for a hybrid Gaussian approximation and hybrid chi-squared method using a relative threshold setting of 0.32.

FIG. 6 shows the results of a simulation using a relative threshold setting of 0.32 (i.e., the threshold is set to a point 32% of the way between the mean 'zero' and 'one' levels), using both the hybrid Gaussian and hybrid chi-squared estimation methods. The OSNR has been increased to 20 dB for this simulation (by decreasing the optical noise power spectral density to $1.62\times10^{-15}$ W/Hz), to allow for the fact that the relative threshold setting results in degraded performance compared to using am optimized decision threshold. Otherwise, all parameters of this simulation are the same as for the previous tests. For a system with additive optical noise, it will always be desirable to set the threshold closer to the 'zero' level, because the variance of the noise on data 'one's is larger, due to the higher level of signal-spontaneous beat noise.

FIG. 6 shows that if a simulation is performed using the Gaussian approximation, very poor performance results compared to the hybrid chi-squared method—over four orders of magnitude difference in the error-rate floor. For low received optical power, where the Gaussian post detection noise dominates, the results are very similar. However, once the optical noise starts to become significant, the two BER curves 61, 62 rapidly diverge. The hybrid chi-squared method provides a superior model of the actual noise statistics at the input of the BER estimator. Thus the results using the hybrid chi-squared method provides a more accurate representation of real system performance. At best, the Gaussian approximation can be seen to produce a conservative estimate of the system performance, however with such a significant discrepancy it is likely that the use of the Gaussian approximation will result in significant over-engineering of a resulting system. It is equally possible that a lower relative threshold setting could be chosen, for which the Gaussian approximation results in predictions of superior BER performance. In this case, the real system could perform significantly worse than predicted by the simulation.

Figure 7:
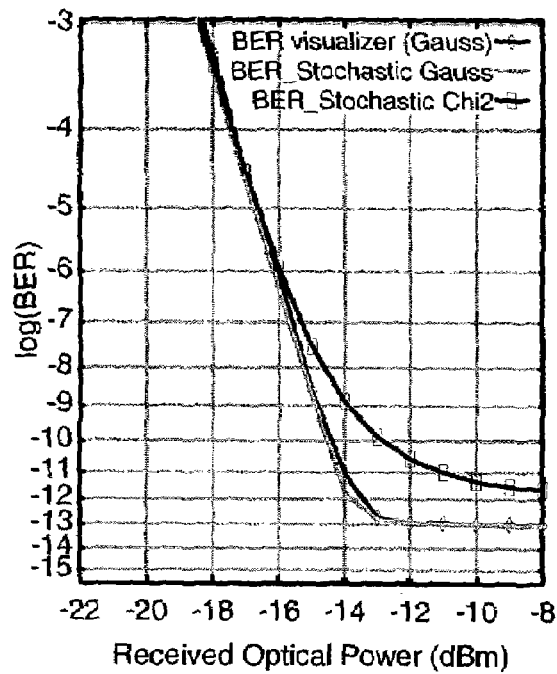
FIG. 7 is a graph showing the comparison of system BER curves for a hybrid Gaussian approximation and hybrid chi-squared method using a relative threshold setting of 0.18.

FIG. 7 shows BER curves where the relative threshold setting has been set to 0.18 (closer to the optimum for Gaussian statistics). In this case, a simulation using the Gaussian approximation predicts an error rate floor at $10^{-13}$, whereas the more realistic hybrid chi-squared method predicts an error rate floor at around $10^{-12}$. There is therefore a very real risk that if the Gaussian approximation is used to determine a suitable relative threshold setting, the performance of the real system may be inferior to that predicted. This is in contrast to the general view that the Gaussian approximation produces a conservative estimate of system performance.

Figure 8:
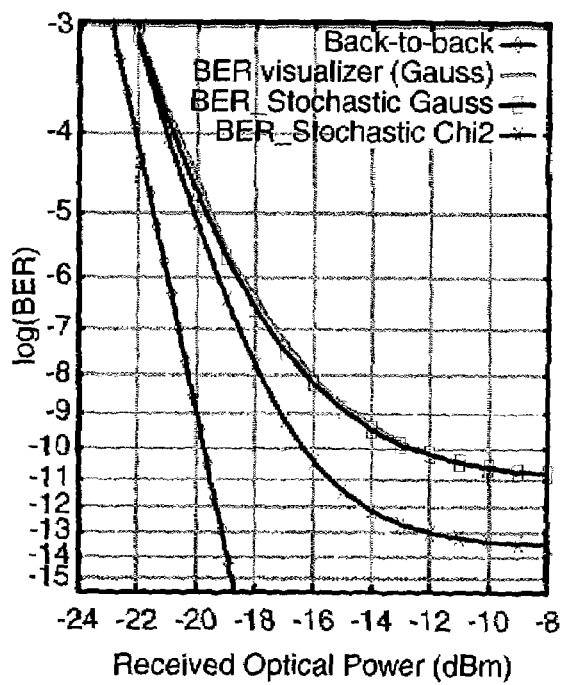
FIG. 8 is a graph showing a comparison of system BER curves for the different methods for an optical filter bandwidth of 25 GHz.

When narrow optical filters are employed, such that the ratio of the optical to electrical bandwidth becomes small (on the order of one), the post-detection statistics of the optical noise become less well-approximated by the Gaussian distribution. This is because the number of degrees of freedom in the non-central chi-squared distribution is smaller. (The non-central chi-squared distribution becomes Gaussian in the limit of large number of degrees of freedom.) In addition, the narrow optical filtering will tend to introduce significant correlations into the post-detection noise that result in the I&D model becoming invalid. FIG. 8 shows the results for the sampled simulation methods when the optical filter bandwidth is reduced to 25 GHz. A slight reduction is apparent in the difference between the back-to-back curve and the system curves at low received optical power. This is a direct result of the reduction in average optical noise power/current due to the reduction in filter bandwidth. The difference between the results using a Gaussian approximation, and those using the hybrid chi-squared method is more significant, as expected. The Gaussian approximation once again produces a slightly lower estimate of the BER than the stochastic Gaussian approximation. The error rate floor is reduced by about two orders of magnitude (for the hybrid chi-squared method) compared to the system using an 80 GHz optical filter bandwidth. This is due mainly to the reduced spontaneous-spontaneous beat noise, which is the main contributing noise source for data zeros.

These examples generally show the advantages of the practical application of the hybrid chi-squared BER estimation method.

For the example system considered, in the absence of optical noise at the receiver input, very good agreement was obtained between the hybrid method in which post-detection Gaussian noise is included deterministically, and the existing purely statistical method in which electrical noise is added prior to low-pass filtering. The difference between a Gaussian approximation, and the new hybrid chi-squared method is consistent with similar results obtained for a semi-analytical technique based on an idealized I&D system model. The example demonstrates that such an idealized system model significantly over-estimates the performance of a practical system. The improved BER estimation technique allows the improvement in system performance due to the non-gaussian statistics of received optical noise to be predicted. If an optimized decision threshold setting is used, the difference between a Gaussian approximation and the new method is most significant when narrow optical filters are employed, with bandwidth of similar order to the electrical bandwidth. For realistic systems using a non-optimized decision threshold, significant errors in the overall BER can occur if an inaccurate model of the detected noise statistics is used, and it is in this case that the hybrid chi-squared method is most clearly superior to a Gaussian approximation.

The main disadvantage of the hybrid chi-squared technique is that it is required to estimate an additional parameter from the input samples, and therefore it is somewhat more susceptible to statistical variations resulting from the finite input sequence. As a result, it generally may require a greater number of bits to be simulated in order to compute results with comparable confidence to the Gaussian approximation methods. The Gaussian approximation remains a reliable fall-back when the hybrid chi-squared technique is not applicable, or when a conservative lower bound on system performance is desired.

Turning now to a more detailed discussion of the theory and algorithm required to implement a hybrid $\chi^2$ system. Initially, it is necessary to define a number of important variables, which in the preferred embodiment are parameters provided by the user.

| Symbol | Definition |
|---|---|
| T | The bit period. Determined by a parameter BitRate (T = 1/BitRate). |
| $t_s$ | The sample time specified by a parameter SampleTime. |
| r | The sample range specified by a parameter SampleRange. |
| $D_t$ | The decision threshold specified by a parameter Threshold. |
| $\sigma_2^p$ | The post-detection noise power spectral density added in the receiver, in current units, as specified by a ThermalNoise parameter. |
| $i_d$ | Dark current, as specified by a DarkCurrent parameter. |
| $B_e$ | Equivalent electrical noise bandwidth, as specified by a ElecNoiseBandwidth parameter. |

The probability of a bit being in error is as follows:

$$BER = P_1 P_{0/1} + P_0 P_{1/0} \quad (3)$$

where:

$P_1$ is the probability of receiving a "one" bit. $P_0$ is the probability of receiving a "zero" bit. $P_{0/1}$ is the probability of deciding that a received bit is "zero" when actually it was "one". $P_{1/0}$ is the probability of deciding that a received bit is "one" when actually it was "zero". To calculate probabilities $P_{0/1}$ and $P_{1/0}$ the probability densities of "one" and "zero" signals and decision threshold should be known.

$$P_{0/1} = \int_{-\infty}^{D} W_1(x) dx \quad (4)$$

$$P_{1/0} = \int_{D}^{\infty} W_0(x) dx \quad (5)$$

where:
D is the decision threshold; $W_1$ is probability density of "one" signal; $W_0$ is probability density of "zero" signal.

Hybrid $\chi^2$ Method:

For the hybrid $\chi^2$ method the distribution functions and error probabilities are defined as follows.

The $\chi^2$ probability density function of squared and averaged optical signal and optical noise can be represented by the formula:

$$W(x) = \frac{M}{I_0} \left(\frac{x}{I_1}\right)^{(M-1)/2} \exp\left(-Mx + \frac{I_1}{I_0}\right) I_{M-1}\left(2\frac{\sqrt{xI_1}}{I_0}M\right) \quad (6)$$

where:

$I_{m-1}(.)$ is a modified Bessel function.

$I_0$ and $I_1$ are two parameters of the $\chi^2$ distribution that between them account for the scaling and non-centrality of the distribution.

M is an integer, being the number of degrees of freedom.

The probability density function of optical signal and optical noise with postdetection gaussian noise cannot be expressed in closed form. It can be obtained as an inverse Fourier transform of its characteristic function:

$$G(\xi) = \frac{\exp\left[-\frac{I_1 I_0}{M - iI_0\xi}\xi^2\right]}{\left(1 - \frac{i}{M}I_0\xi\right)^M}\exp\left(-\frac{1}{2}\sigma_p^2\xi^2\right)\exp(iI_0\xi) \quad (7)$$

where: $\sigma_p^2$ is the variance of postdetection gaussian noise and i is the imaginary unit.

Using the steepest descent method the following approximation of probability density function can be obtained:

$$W(x) = \frac{M}{I_0} \frac{\exp(F(u_0))}{\sqrt{2\pi\left(\frac{d^2F}{du^2}\right)_{u=u_0}}} \quad (8)$$

where:

$$F(u) = M\left(\frac{u-1}{u} - \frac{I_1}{I_0}\left(\frac{u-1}{u}\right)^2\right) - M\ln(u) + \frac{1}{2}\left(\frac{M}{I_0}\sigma_p\right)^2(u-1)^2 \quad (9)$$

$$\left(\frac{d^2F}{du^2}\right)_{u=u_0} = M\left[\frac{2}{u_0^3}\frac{I_1}{I_0} + \frac{1}{u_0^2} + M\frac{\sigma_p^2}{I_0^2}\right] \quad (10)$$

and $u_0$ is maximal real positive root of the equation $$\left(\frac{dF}{du}\right) = u^3 + u^2\left(\frac{xI_0}{M\sigma_p^2} - 1\right) - u\frac{I_0^2}{M\sigma_p^2} - \frac{I_0 I_1}{M\sigma_p^2} = 0 \quad (11)$$

For "one" and "zero" signals there are two parameter sets of probability density:

$I_{01}$, $I_{11}$, $M_1$—for "one" signal $I_{00}$, $I_{10}$, $M_0$—for "zero" signal.

Using the symbolism below that index 1 means that in the expression parameter set for "one" signal is used, and index 0 means that parameter set for "zero" signal is used, the probabilities (4) and (5) of error can be calculated as $$P_{0/1} = P_1(u_{D1}) \quad (12)$$

$$P_{1/0} = P_0(u_{D0}) \quad (13)$$

where $$P_k(u) = \sqrt{\frac{MA_k(u)}{2\pi u^3}} \frac{\exp[F_k(u)]}{\left|\frac{u-1}{u^3}MA_k(u) + \frac{B_k(u)}{uA_k(u)}\right|} \quad (14)$$

-continued $$A(u) = 2\frac{I_1}{I_0} + u + M\frac{\sigma_p^2}{I_0^2}u^3 \quad (15)$$

$$B(u) = 3\frac{I_1}{I_0} + u \quad (16)$$

$u_{Dk}$ (k=0, 1) are the maximum real positive solutions of equation (11) with corresponding indices and x=D i.e.

$$\left(\frac{dF_k}{du}\right)_{u=u_{Dk}} = 0 \quad k = 0, 1 \quad (17)$$

The optimal decision threshold should be found from the equation $$P_1 W_1(D) = P_0 W_0(D) \quad (18)$$

which can be solved numerically.

Hybrid Gaussian Method:

For the hybrid Gaussian method the distribution functions and error probabilities are defined as follows.

A Gaussian probability density is as follows:

$$W(x) = \frac{1}{\sigma\sqrt{2\pi}}\exp\left(-\frac{(x-\mu)^2}{2\sigma^2}\right) \quad (19)$$

where:

$\sigma^2$ is total noise variance, which includes optical and post detection noise $\mu$ is the mean value of the signal.

The probabilities (4) and (5) are therefore:

$$P_{0/1} = \frac{1}{\sigma_1\sqrt{2\pi}}\int_{-\infty}^{D}\exp\left(-\frac{(x-\mu_1)^2}{2\sigma_1^2}\right)dx = \frac{1}{2}\text{erfc}\left(\frac{|\mu_1 - D|}{\sigma_1\sqrt{2}}\right) \quad (20)$$

$$P_{1/0} = \frac{1}{\sigma_0\sqrt{2\pi}}\int_{D}^{\infty}\exp\left(-\frac{(x-\mu_0)^2}{2\sigma_0^2}\right)dx = \frac{1}{2}\text{erfc}\left(\frac{|D - \mu_0|}{\sigma_0\sqrt{2}}\right) \quad (21)$$

The optimal decision threshold $D_{opt}$ should be found from equation $$P_1 W_1(D_{opt}) = P_0 W_0(D_{opt}) \quad (22)$$

which is calculated as:

$$D_{opt} = \quad (23)$$

$$\frac{1}{\sigma_0^2 - \sigma_1^2}\left(I_1\sigma_0^2 - I_0\sigma_1^2 - \sigma_0\sigma_1\sqrt{(I_0 - I_1)^2 - 2\ln\left(\frac{\sigma_1 P_0}{\sigma_0 P_1}\right)(\sigma_0^2 - \sigma_1^2)}\right)$$

Additional Calculations:

For both the hybrid $\chi^2$ and hybrid Gaussian methods, the following additional quantities may be calculated.

The effective Q factor should be found from the equation:

$$BER(D_{opt}) = \frac{1}{2}\text{erfc}\left(\frac{Q_{eff}}{\sqrt{2}}\right) \quad (24)$$

which can be solved numerically.

The algorithm of Q factor calculation is independent of the assumption made on noise statistics, and can be calculated as:

$$Q = \frac{\mu_1 - \mu_0}{\sigma_1 + \sigma_0} \quad (25)$$

where, $\mu_1$, $\mu_0$, $\sigma_1$, $\sigma_0$ are mean values and variances (including optical and postdetection noise) of "one" and "zero" signals respectively.

The eye opening (EO) calculation is independent of the assumption made on noise statistics, and can be calculated as:

$$EO = (\mu_1 - 3\sigma_1) - (\mu_0 + 3\sigma_0) \quad (26)$$

Algorithm Implementation

Figure 9:
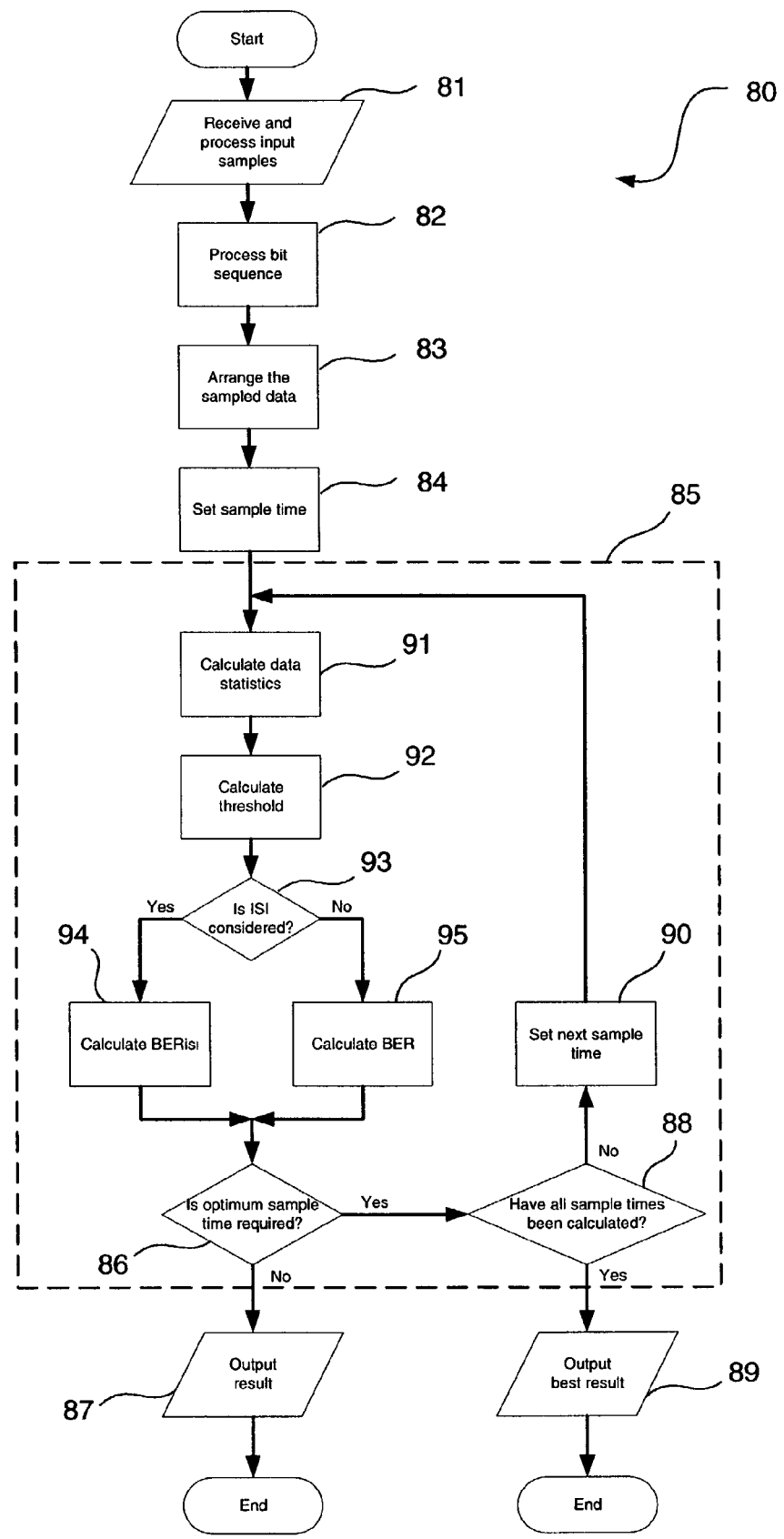
FIG. 9 is a flow chart of the steps in the preferred embodiment.

An overall algorithm 80 can be implemented via the steps 81 to 95 as shown in FIG. 9.

Initially the input samples representing the optical signal waveform are processed 81 so as to conform to the requirements of the algorithm. The original bit sequence is then processed 82 to correlate the signal samples with the transmitted bits. The sampled data is then arranged 83 into groups of samples corresponding to sampling instants within each bit. Depending upon user requirements, the core calculations 91 to 95 may be carried out for a single set sample time 84, or for all sample times starting with an initial set sample time 84 followed by other sample times according to the loop 85. If a single sample time only is considered, the result corresponding to this sample time is output 87. Otherwise an optimum result can be calculated by selecting the best result 89 from those calculated for each sample time.

The calculations required to complete these steps are described in greater detail under the following headings:

1. Receive the Input Data (81)

The input electrical sampled signal and the input bit sequence should be received and stored. Denote:

NSamples is number of electrical samples in the block under processing.

$E_i$ is an electrical sample, i=1 ... NSamples.

NBits is number of bits in the bit sequence under processing.

$B_i$ is symbol of bit sequence i=1 ... NBits. $B_i$ can be either 0 or 1.

If some electrical samples are negative then an offset x should be added to all samples, according to the following equations:

$$x = abs(\min(E_i)), i=1 \ldots NSamples \quad (27)$$

$$E_i = E_i + x \quad (28)$$

2. Process the Bit Sequence (82)

Normally it is assumed that received bit sequence consists only of two different symbols "0" and "1", but when ISI is taken into account the preceding and subsequent symbols have impact on the parameters of the signal, representing the current symbol. In this case each symbol of the bit sequence can be considered to correspond to one of eight metasymbols: 000, 001, 010, 011, 100, 101, 110, 111.

| Metasymbol | Subsequent Symbol | Current Symbol | Preceding Symbol |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Denote:
$MS_i$ is the metasymbol corresponding to i bit in the bit sequence, i = 1 ... NBits.

The algorithm for transforming a symbol to its corresponding metasymbol is:

$$MS_i = B_{i-1} + 2B_i + 4B_{i+1} \quad (29)$$

When i=1, $B_{i-1} = B_{NBits}$ for periodic boundary conditions and $B_{i-1} = 0$ for aperiodic boundary conditions.

When i=Nbits, $B_{i+1} = B_1$ for periodic boundary conditions and $B_{i+1} = 0$ for aperiodic boundary conditions.

Denote:
NOnes is number of "one" symbols in the bit sequence.
NZeros is number of "zero" symbols in the bit sequence.
$NMS_i$ is number of i metasymbol in the bit sequence.

3. Arrange the Sampled Data (83)

Figure 10:
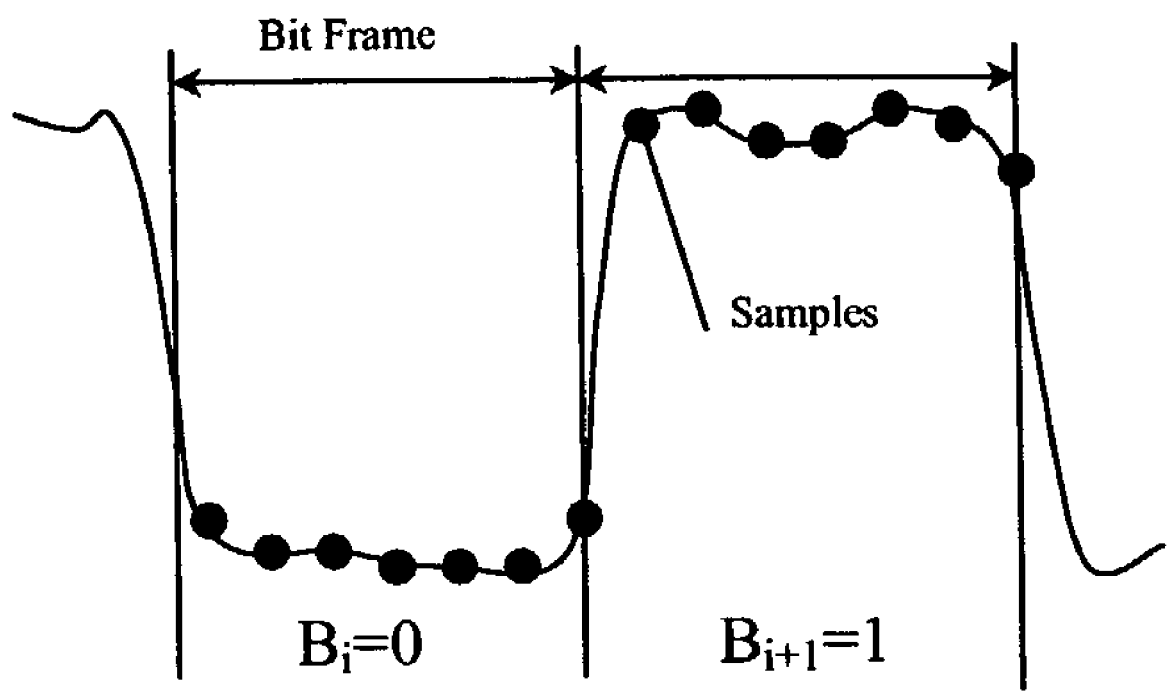
FIG. 10 illustrates the sampling process utilized in the preferred embodiment.

The sample representing each bit of the sequence can be taken at NSamplesPerBit instants, as shown in FIG. 10 where the sampling instants are drawn as black dots. Consequently, there will be NSamplesPerBit different BER values corresponding to each time instant at which the signals are sampled. Thus it is possible to write BER=BER($t_{sample}$), Q=Q($t_{sample}$), $Q_{eff}=Q_{eff}(t_{sample})$, $t_{sample}=1 \ldots$ NSamplesPerBit.

The number of samples per bit is simply related to the sample rate as follows:

$$NSamplesPerBit = T \times SampleRate \quad (30)$$

The data samples should be arranged into groups representing each symbol (or metasymbol if ISI is considered), at all possible sampling instants. In other words, for each possible sampling instant we shall have groups of samples corresponding to "one" and "zero" bits, or to each of eight metasymbols if ISI is considered.

4. Determine the Sample Time (84, 85)

A single desired sample time for the calculations may be specified by the user. In this case, the sample time is set 84, and the core calculations 91 to 95 are performed for this one sample time. The BER and Q values corresponding to this specific sample time should be the module's output 87.

Alternatively, and more commonly, an optimum result or results for a range of sample times may be required. In this case an initial sample time is set 84, and then the core calculations 91 to 95 are carried out for all sample times via the loop 85. The BER, Q and Eye Opening values should be estimated at all possible sampling instants according to the decisions 86, 87, and wherein upon each execution of the loop a different sampling time is selected 90. Then the sampling instant at which BER is minimal $t_{min}$ should be determined and the BER, and Q values corresponding to $t_{sample} = t_{min}$ should be the module's output 89. If BER takes its minimal value at more than one sampling instant, then from these instants one should be selected at which Q value is maximal. The index of sampling instant relative to the bit frame is determined as $$t_{sample} = \text{round}(t_s \times N\text{SamplesPerBit}) \quad (31)$$

The sample from which averaging starts (relative to the bit frame) can be determined as:

$$t_{start} = \max(1, t_{sample} - abs(\text{round}(0.5 \times r \times N\text{SamplesPerBit})) \quad (32)$$

The sample from which averaging ends (relative to the bit frame) can be determined as:

$$t_{stop} = \min(t_{sample} + abs(\text{round}(0.5 \times r \times N\text{SamplesPerBit}), N\text{SamplesPerBit}) \quad (33)$$

Output values of the module should be calculated as:

$$BER = \frac{\sum_{k=t_{start}}^{t_{stop}} BER(k)}{1 + t_{stop} - t_{start}} \quad (34)$$

$$Q = \frac{\sum_{k=t_{start}}^{t_{stop}} Q(k)}{1 + t_{stop} - t_{start}} \quad (35)$$

5. Calculate Data Statistics (91)

For BER, Q, threshold and Eye opening calculations the variance and mean values of data samples corresponding to the "one" and "zero" symbols are used. Denote:

$\mu_1$ is the mean value, corresponding to "one" symbols.
$\mu_0$ is the mean value, corresponding to "zero" symbols.
$\sigma_1^2$ is the variance, corresponding to "one" symbols.
$\sigma_0^2$ is the variance, corresponding to "zero" symbols.

If ISI is not considered $$\mu_1 = \frac{\sum_{ones} E_i}{NOnes} \quad (36)$$

$$\mu_0 = \frac{\sum_{zeros} E_i}{NZeros} \quad (37)$$

$$\sigma_1^2 = \frac{1}{NOnes - 1} \sum_{ones} (\mu_1 - E_i)^2 \quad (38)$$

$$\sigma_0^2 = \frac{1}{NZeros} \sum_{zeros} (\mu_0 - E_i)^2 \quad (39)$$

where $$\sum_{zeros} \text{ and } \sum_{ones}$$

denote sum over samples representing "zero" or "one" symbol taken at the defined time instant $t_{sample}$. If ISI is considered then the statistics should be calculated for each metasymbol. And the total statistics for "one" and "zero" symbols should be also calculated.

Denote:

$\mu_i$ is the mean value, corresponding to i metasymbol.
$\sigma_i$ is the variance, corresponding to i metasymbol.

$$\mu_i = \frac{\sum_{NMS_i} E_k}{NMS_i} \quad (40)$$

$$\sigma_i^2 = \frac{1}{NMS_i - 1} \sum_{NMS_i} (\mu_1 - E_k)^2 \quad (41)$$

where $$\sum_{NMS_i}$$

denotes sum over samples representing i metasymbol, taken at the defined time instant $t_{sample}$.

6. Determine the Threshold (92)

To be able to claculate values of BER the decision threshold D should be known. Depending upon requirements, an absolute threshold can specified by a parameter Threshold.

$$D = D_l \quad (42)$$

Or if relative thresholding is used, the decision threshold can be:

$$D = \mu_0 + D_l(\mu_l - \mu_0) \quad (43)$$

If a parameter ThresholdType is set to Optimum and ISI is not considered, then for gaussian assumption optimal threshold is obtained as follows:

If $\sigma_l <> \sigma_0$ and $\sigma_1 < 0$ and $\sigma_0 > 0$ optimal threshold is calculated in accordance with (23), where $$P_1 = \frac{NOnes}{NOnes + NZeros} \quad (44)$$

$$P_0 = \frac{NZeros}{NOnes + NZeros} \quad (45)$$

If $\sigma_1 = \sigma_0$ then optimal threshold is calculated as:

$$D = (\mu_1 - \mu_0)/2 \quad (46)$$

If the parameter ThresholdType is set to Optimum and ISI is not considered, then for chi-square assumption optimal threshold is obtained as solution of equation (18) with $P_1$ and $P_0$ calculated in accordance with (44) and (45). This equation should be solved numerically by the bisection method on the interval $D \in [\mu_0, \mu_1]$ with tolerance $\epsilon = (\mu_1 - \mu_0)/10000$. This procedure requires calculation of the PDF (8). The calculation of the PDF is described below.

If the parameter ThresholdType is set to Optimum and ISI is considered, then independently on statistical assumption optimal decision threshold is found by numerical minimization of $BER_{ISI}(D)$ on the interval $D \in [\mu_0, \mu_1]$ by the method of golden section. Calculation of $BER_{ISI}$ is described below.

7. Calculation of BERisi (93, 94)

When ISI is considered according to the decision 93 then total BER is calculated 94 as a weighted sum of error probabilities for each metasymbol, according to the following equation:

$$BER(D) = \sum_{I=1}^{8} \frac{NMS_I}{\sum_{i=1}^{8} NMS_i} BER_i(D) \qquad (49)$$

where $BER_i(D)$ is BER for i metasymbol. The BER of each metasymbol is calculated as follows.

For metasymbols representing logical "one" (i.e., i=2,3, 6,7) calculation can be according to (20) if a parameter 'EstimationMethod' is set to Gauss_ISI, and according to (12) if the parameter EstimationMethod is set to Chi2_ISI.

For metasymbols representing logical "zero" (i.e., i=1,4, 5,8) calculation can be according to (21) if parameter EstimationMethod is set to Gauss_ISI, and according to (13) if parameter EstimationMethod is set to Chi2_ISI.

8. Calculate the Hybrid $\chi^2$ PDF

This procedure is required when PDF parameter fitting is performed for the calculation of BER 95 or BERisi 94, and also when optimal threshold is calculated 92. Under this heading, the calculation of the PDF itself is described, assuming its parameters are known. The hybrid $\chi^2$ PDF $W(x)$ has four parameters: $I_0$, $I_1$, $M$, $\sigma_p^2$, the actual calculation of which under various conditions is described under the following heading.

(a) Calculation of PDF with Negligible Postdetection Noise

If $\sigma_p^2=0$ or $I_0(2I_1+I_0)/M > 1000\sigma_p^2$, then equation (6) should be used for PDF calculation. Variance of optical noise is 1000 times larger than variance of postdetection noise, and postdetection noise can be neglected. The method of computing equation (6) can be dependent on the argument and parameter values. If x<0 then $$W(x)=0 \qquad (50)$$

Otherwise, the first argument of the Bessel function should be calculated:

$$argum = \frac{2M\sqrt{xI_1}}{I_0} \qquad (51)$$

Then if $I_{m-1}(argum)=0$ then logarithm of (6) should be calculated by one of the following:

If M−1 > 3 × argum then $$\ln(W(x)) = \ln\left(\frac{M}{I_0}\right) + \frac{M-1}{2}\ln\left(\frac{x}{I_1}\right) - \frac{M(x+I_1)}{I_0} - gammaln(M) + (M-1)\ln\left(\frac{argum}{2}\right) \qquad (52)$$

where gammaln(M) is logarithm of gamma function, the calculation of which is more fully described in William H. Press et al., *Numerical Recipes in C: The Art of Scientific Computing*, $2^{nd}$ ed.

If argum > 3×(M−1) then $$\ln(W(x)) = \ln\left(\frac{M}{I_0}\right) + \frac{M-1}{2}\ln\left(\frac{x}{I_1}\right) - \frac{M(x+I_1)}{I_0} + argum - \frac{\ln(2\pi\, argum)}{2} \qquad (53)$$

If argum<=3×(M−1) and M−1 > 3×argum then $$W(x)=0 \qquad (54)$$

If $I_{M-1}(argum)=\infty$, i.e., overflow occurs during calculation (this condition can be replaced with argum>700), then a scaled Bessel function can be used.

$$BS_\nu(z)=I_\nu(z)e^{-|z|} \qquad (55)$$

and the PDF is calculated as:

If $BS_{M-1}(argum)=0$ then $$W(x)=0 \qquad (56)$$

If $BS_{M-1}(argum)<>0$ then $$\ln(W(x)) = \qquad (57)$$

$$\ln\left(\frac{M}{I_0}\right) + \frac{M-1}{2}\ln\left(\frac{x}{I_1}\right) + \frac{M\left(2\sqrt{xI_1}-x-I_1\right)}{I_0} + \ln(BS_{M-1}(argum))$$

If $I_{m-1}(argum)<>0$ and $I_{M-1}(argum)<>\infty$ then PDF is calculated in accordance with (6).

(b) Calculation of PDF with Postdetection Noise

At first maximal positive real root of equation (11) should be found.

(1) Solving Equation (11)

If $\sigma_p^2=0$ then (9) becomes quadratic and the root needed is:

$$u_0 = \frac{I_0}{2y} + \sqrt{\left(\frac{I_0}{2y}\right)^2 + \frac{I_1}{y}} \qquad (58)$$

If $\sigma_p^2 \neq 0$, then equation (11) is solved by Newton's method as follows.

The initial value $u_0^0$ from which iterations start is found by the following iterative algorithm. First two intermediate values are calculated a, and b.

$$a = \frac{xI_0}{M\sigma_p^2} - 1 \qquad (59)$$

$$b = -\frac{I_0^2}{M\sigma_p^2} \qquad (60)$$

The starting point for iterations to find $u_0^0$ is calculated as:

$$\begin{cases} u_0^{0,0} = a\left(-\frac{1}{3} + \sqrt{\frac{1}{9} - \frac{\sigma_p^2 M}{x^2}}\right), & a > 1000 \\ u_0^{0,0} = -\frac{a}{3} + \sqrt{\frac{a^2}{9} - b}, & a \leq 1000 \end{cases} \quad (61)$$

The iteration algorithm is defined by:

$$u_0^{0,i+1} = u_0^{0,i} + \left| \frac{dF}{du} \middle/ div(u_0^{0,i}, x, I_0, I_1, M, \sigma_p^2) \right| + \varepsilon \quad (62)$$

where $$\varepsilon = 1 \times 10^{-15}, \frac{dF}{du}$$

is given in (11) and $div(u, x, I_0, I_1, M, \sigma_p^2)$ is calculated as:

$$div(u, x, I_0, I_1, M, \sigma_p^2) = 3_u^2 + 2u\left(\frac{xI_0}{M\sigma_p^2} - 1\right) - \frac{I_0^2}{M\sigma_p^2} \quad (63)$$

The iterations (62) are performed while $$\frac{dF}{du}$$

or $u < 0$.

The iterative procedure for finding $u_0$ is described by:

$$u_0^{i+1} = u_0^i - \frac{dF}{du} \middle/ div(u_0^i, x, I_0, I_1, M, \sigma_p^2) \quad (64)$$

If $div(u_0^1, x, I_0, I_1, M, \sigma_p^2) = 0$ then $div(u_0^i + \Delta/2, x, I_0, I_1, M, \sigma_p^2)$ should be used in divisor, where:

$$\Delta = u_0^{i+1} - u_0^i \quad (65)$$

and the initial value of $\Delta$ is $\Delta_0 = 10$.

The iterations continue while $$\left| \frac{\Delta}{u_0^{i+1}} \right| > \varepsilon,$$

or until number of iterations exceeds 1000. When $u_0$ is found, the PDF is calculated using (8), (9), (10).

9. Calculation of Hybrid $\chi^2$ PDF Parameters

In order to compute the $\chi^2$ PDF as described under the preceding heading, the four parameters of the hybrid $\chi^2$ PDF must be calculated from the input data and parameters. The following procedure is used.

(a) Calculation of the Postdetection Noise Variance

The postdetection noise variance is given by the equation:

$$\sigma_P^2 = \sigma_{th}^2 + \sigma_s^2 \quad (66)$$

The shot noise variance $\sigma_s^2$ is calculated as:

$$\sigma_s^2 = 2q(\mu_k + i_d)B_e \quad (67)$$

where $\mu_k$ is mean value of the data samples representing either "one" or "zero" symbol (k=1 for the samples representing "one" symbol and k=0 for the samples representing "zero" symbol) and q is the electron charge. The thermal noise variance $\sigma_{th}^2$ is given by:

$$\sigma_{th}^2 = \sigma_p^2 B_e \quad (68)$$

(b) Fitting of $I_0$, $I_1$, M Parameters

To determine parameters $I_0$, $I_1$, M, the mean value $\mu$ and standard deviation $\sigma$ of data samples can be used. The PDF could be calculated then as function of $\mu$, $\sigma$, and M, so as to obtain function a depending on one unknown parameter. This parameter should be found by a fitting procedure:

The maximum possible value of M is $$M_{max} = \text{floor}\left(\frac{\mu^2}{\sigma^2}\right) \quad (69)$$

A merit function can be constructed so that it is dependent on only one parameter M and then minimized on the interval $M \in [1, M_{max}]$ with tolerance 0.5 (since M is integer). If $M_{max} < 1$ then a chi-square fit cannot be performed. The merit function is chi-square statistic $\chi^2$. The algorithm of $\chi^2$ calculation is as follows:

Define:

n to be the number of samples in the data being fitted.

Arrange data as a $n_b$-bins (class interval) histogram: $m_i$, $x_i$, $i=1 \ldots n_b$, where:

$m_i$-number of samples in i- class interval.

$x_i$-center of i class interval.

The number of bins $n_b$ is calculated as:

$$n_b = \text{floor}\left(\frac{\max(\text{data}) - \min(\text{data})}{0.4\sqrt{\sigma^2}}\right) \quad (70)$$

Then the expected frequencies for histogram are calculated.

$$np_i = nf(x_i)\Delta x \quad (71)$$

where:

$\Delta x = (\max(\text{data}) - \min(\text{data}))/n_b$ is the width of the class interval Define the fitting function $f(x_i)$ to be the chi square PDF which is calculated depending only upon M using equation (6) with $$I_1 = \sqrt{\mu^2 - M\sigma^2} \quad (72)$$

$$I_0 = \mu - I_1 \quad (73)$$

If, for some j, $np_j < 10$, then those bins should be combined into one using the following procedure:

Define:

R to be the index of the last bin which has expected frequency>10

L to be the index of the first bin which has expected frequency>10

Then the right tail $T_R$ is the sum of all bins with indices from R to $n_b$ $$T_R = \sum_{k=R}^{n_b} m_k \qquad (74)$$

The left tail $T_L$ is the sum of all bins with indices from 1 to L inclusive;

$$T_L = \sum_{k=1}^{L} m_k \qquad (75)$$

Expected frequencies for tails are calculated as sums of expected frequencies for combined bins.

$$E_R = n \sum_{k=R}^{n_b} P_k \qquad E_L = n \sum_{k=1}^{L} P_k \qquad (76)$$

Then combined bins should not be considered. Note that after combining bins $n_b$ is reduced, so the right tail should be calculated first.

If number of valid intervals r (number of intervals left after combining bins) is less than 4 then $$\chi^2 = n^2 \qquad (77)$$

The chi-square statistic is calculated as:

$$\chi^2 = \frac{(T_R - E_R)^2}{E_R} + \frac{(T_L - E_L)^2}{E_L} + \sum_{i=1}^{r} \frac{(m_i - np_i)^2}{np_i} \qquad (78)$$

After the minimization procedure is finished all parameters of the PDF are found from (72), (73).

10. Calculation of the Bit Error Rate

Given the parameters of the hybrid $\chi^2$ PDF, calculation of the BER 95 or BERisi 94 can be carried out using the equations previously described. If ISI is not considered 95, then BER is calculated using (1) with (44), (45). If ISI is considered 94 then BER is calculated using (49). The conditional probabilities $P_{0/1}$ and $P_{1/0}$ are calculated according to the following methods for chi-square and gaussian assumptions respectively.

(a) Hybrid $\chi^2$ Method

In the chi-square assumption for data representing any symbol (or metasymbol) conditional probabilities as a function of decision threshold D and PDF parameters $I_0$, $I_1$, M, $\sigma_p^2$ are calculated as:

If $D \leq I_0 + I_1$ then $P_k = 1$, k denotes 0/1 or 1/0

If $D > I_0 + I_1$ then $P_k$ is calculated using (12–17).

The value of $P_k$ should be limited: if it occurs that $P_k > 1$ then $P_k = 1$ should be output.

(b) Hybrid Gaussian Method

In the prior art method based on the gaussian assumption the conditional probabilities of error are simply calculated according to (20), (21) with:

$$\sigma_k = \sqrt{\sigma_p^2 + \sigma^2}, \ k = 0, 1 \qquad (79)$$

where $\sigma^2$ is estimated variance of the samples, representing the symbol for which error probability is calculated.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the spirit of the invention or the scope of the appended claims.

We claim:

1. A method for estimating a measure of the quality of a received signal in a computer simulation of an optical transmission system, wherein the simulation includes additive optical noise generated by components within the transmission system, the method including the steps of:
   a) calculating one or more sets of parameters of a first non-gaussian probability density function so as to approximate a suitable fit to the amplitude distribution of the received signal, including the effects of deterministic processing in the receiver but excluding the effects of statistical noise fluctuations introduced by the receiver;
   b) calculating one or more sets of parameters of a second non-gaussian probability density function that approximates a suitable fit to the amplitude distribution of the received signal, including the effects of deterministic processing and statistical noise fluctuations in the received signal using the calculated set(s) of parameters of the first non-gaussian probability density function and pre-specified statistical properties of the noise fluctuations introduced by the receiver; and
   c) computing the measure of quality using the set(s) of parameters of the second non-gaussian probability density function; and d) outputting the computed measure of quality.

2. The method of claim 1 wherein said components of the transmission system include optical amplifiers.

3. The method of claim 2 wherein said optical amplifiers comprise erbium-doped fiber amplifiers.

4. The method of claim 1 wherein said statistical properties of the noise introduced by the receiver comprise a gaussian distribution characterized by its mean and variance.

5. The method of claim 1 wherein said first non-gaussian probability density function comprises a non-central chi square ($\chi^2$) probability density function.

6. The method of claim 1 wherein said received signal comprises an intensity-modulated digital signal.

7. The method of claim 6 wherein said measure of the quality of the received signal comprises the bit-error-rate.

8. The method of claim 7 wherein at least two sets of parameters for each of said first and second non-gaussian probability density functions are calculated, corresponding with respective pairs of received binary data levels.

9. The method of claim 1 wherein said received signal is passed through a narrow optical filter prior to reception.

10. A method for estimating a measure of the quality of a received signal in a computer simulation of an optical transmission system, wherein the simulation includes additive optical noise generated by optical amplifiers within the transmission system, the method including the steps of:
  a) calculating one or more sets of parameters of a non-central chi square ($\chi^2$) probability density function so as to approximate a suitable fit to the amplitude distribution of the received signal, including the effects of deterministic processing in the receiver but excluding the effects of statistical noise fluctuations introduced by the receiver;
  b) calculating one or more sets of parameters of a non-gaussian probability density function that approximates a suitable fit to the amplitude distribution of the received signal, including the effects of deterministic processing and statistical noise fluctuations in the received signal using the calculated set(s) of parameters of the non-central $\chi^2$ probability density function and pre-specified statistical properties of the noise fluctuations introduced by the receiver; and
  c) computing the measure of quality using the set(s) of parameters of the second non-gaussian probability density function; and d) outputting the computed measure of quality.

11. A method for estimating a bit-error-rate of a received digital signal in a computer simulation of an optical transmission system, wherein the simulation includes additive optical noise generated by optical amplifiers within the transmission system, the method including the steps of:
  a) calculating two sets of parameters of a non-central chi square ($\chi^2$) probability density function so as to approximate a suitable fit to the amplitude distributions of data "ones" and data "zeros" of the received signal, including the effects of deterministic processing in the receiver but excluding the effects of statistical noise fluctuations introduced by the receiver;
  b) calculating two sets of parameters of a non-gaussian probability density function that approximates a suitable fit to the amplitude distributions of date "ones" and data "zeros" of the received signal, including the effects of deterministic processing and statistical noise fluctuations in the receives signal using the calculated set(s) of parameters of the non-central $\chi^2$ probability density function; and pre-specified statistical properties of the noise fluctuations introduced by the receiver wherein said statistical properties comprise a gaussian distribution characterized by its means and variance; and
  c) computing the bit-error-rate using the set(s) of parameters of the second non-gaussian probability density function and d) outputting the computed bit error rate.

12. A computer readable medium having computer-executable instructions stored thereon for performing a method of estimating a measure of the quality of a received signal in a computer simulation of an optical transmission system, the simulation including additive optical noise generated by components within the transmission system, the method comprising:
  a) calculating one or more sets of parameters of a first non-gaussian probability density function so as to approximate a suitable fit to the amplitude distribution of the received signal, including the effects of deterministic processing in the receiver but excluding the effects of statistical noise fluctuations introduced by the receiver;
  b) calculating one or more sets of parameters of a second non-gaussian probability density function that approximates a suitable fit to the amplitude distribution of the received signal, including the effects of deterministic processing and statistical noise fluctuations in the received signal using the calculated set(s) of parameters of the first non-gaussian probability density function and pre-specified statistical properties of the noise fluctuations introduced by the receiver; and
  c) computing the measure of quality using the set(s) of parameters of the second non-gaussian probability density function; wherein the computed measure of quality is configured to be an output.

13. The computer readable medium of claim 12, wherein said components of the transmission system include optical amplifiers.

14. The computer readable medium of claim 13, wherein said optical amplifiers compnse erbium-doped fiber amplifiers.

15. The computer readable medium of claim 12, wherein said statistical properties of the noise introduced by the receiver comprise a gaussian distribution characterized by its mean and variance.

16. The computer readable medium of claim 12, wherein said first non-gaussian probability density function comprises a non-central chi square ($\chi^2$) probability density function.

17. The computer readable medium of claim 12, wherein said received signal comprises an intensity-modulated digital signal.

18. The computer readable medium of claim 17, wherein said measure of the quality of the received signal comprises the bit-error-rate.

19. The computer readable medium of claim 18, wherein at least two sets of parameters for each of said first and second non-gaussian probability density functions are calculated, corresponding with respective pairs of received binary data levels.

20. The computer readable medium of claim 12, wherein said received signal is passed through a narrow optical filter prior to reception.

* * * * *